United States Patent
Pratt et al.

[11] Patent Number: 5,818,005
[45] Date of Patent: Oct. 6, 1998

[54] ELECTRICAL DISCHARGE MACHINING ELECTRODE AND RAPID METHOD FOR FABRICATING SAME

[75] Inventors: Steven D. Pratt; Sivakumar Muthuswamy, both of Plantation; Robert W. Pennisi, Ocean Ridge, all of Fla.

[73] Assignee: Motorola, Inc., Schaumburg, Ill.

[21] Appl. No.: 840,004

[22] Filed: Apr. 24, 1997

[51] Int. Cl.$^6$ .................................................. B23H 1/04
[52] U.S. Cl. ..................................................... 219/69.15
[58] Field of Search ..................... 219/69.15; 264/401; 205/70

[56] References Cited

U.S. PATENT DOCUMENTS

| | | | |
|---|---|---|---|
| 3,459,915 | 8/1969 | Swazy et al. | 219/69.15 |
| 4,373,127 | 2/1983 | Haskett et al. | 219/69.15 |
| 4,459,453 | 7/1984 | Inoue | 219/69.17 |
| 4,647,748 | 3/1987 | Glassman | 219/69.15 |
| 4,952,768 | 8/1990 | Mohri et al. | 219/69.15 |
| 5,108,555 | 4/1992 | Nishimuro et al. | 205/184 |
| 5,250,172 | 10/1993 | Vargas-Gutierrez et al. | 205/70 |
| 5,458,825 | 10/1995 | Grolman et al. | 264/401 |
| 5,616,293 | 4/1997 | Ashtiani-Zarandi et al. | 264/401 |
| 5,641,448 | 6/1997 | Yeung et al. | 264/401 |

FOREIGN PATENT DOCUMENTS

| | | | |
|---|---|---|---|
| 5-311207 | 11/1993 | Japan | 264/401 |

OTHER PUBLICATIONS

"3M uses Selective Laser Sintering to Create EDM Electrode for Production Injectioin Mold," *Rapid Prototyping Report*, Sep. 1995, pp. 1–2.

"Instant Prototypes?" Just About!, by Doug Smock, Executive Editor, *Plastics World*, Aug. 1996, pp. 45–49, pp. 51–53.

"Isostatic Pressing: Stating the Art," *Tooling & Production* Reprint. No Publication Date.

*Primary Examiner*—Geoffrey S. Evans
*Attorney, Agent, or Firm*—Dale W. Dorinski

[57] ABSTRACT

A rapid method for fabricating a precision electrical discharge machining (EDM) electrode (71). A set of master parts (31, 32) in the shape of the EDM electrode is formed using stereolithography or other rapid prototyping techniques (106). The master parts are assembled and a flexible material is molded (109, 56, 57) in them to form a flexible mold (111, 61). The flexible mold is then filled (115) with electrically conductive powder and the powder is cold isostatically pressed (117) to solidify it and form the EDM electrode.

5 Claims, 7 Drawing Sheets

Ｕ.Ｓ. Patent №. 5,818,005

ELECTRICAL DISCHARGE MACHINING ELECTRODE AND RAPID METHOD FOR FABRICATING SAME

CROSS REFERENCE TO RELATED APPLICATIONS

This application is related to U.S. application Ser. No. 08/840,003, filed concurrently herewith, entitled "Tooling Die Insert and Rapid Method for Fabricating Same," by Pratt, et al., and assigned to Motorola, Inc.

TECHNICAL FIELD

This invention relates to an electrode for electrical discharge machining used for diesinking and to a process for manufacturing the same.

BACKGROUND

Conventionally, electrodes for electrical discharge machining (EDM) used for diesinking are fabricated from bar stock using three-dimensional machining. This process involves waste of materials and requires extensive expertise and expensive machinery to perform precision machining of each electrode. In the case of dies having complex geometrical shape, such as dies for injection molding plastic radio housings, many (oftentimes hundreds) of separate electrodes are necessary to EDM the intricate geometry of the die. Thus, using the conventional process of machining each electrode one at a time from bar stock is extremely costly and time consuming.

The most common bar stock materials used in machining EDM electrodes are graphite/beryllium/copper alloys. Other bar stock materials less commonly used include common metals such as copper, brass and zinc, tungsten and tungsten composites, and exotic metals such as tantalum, nickel and molybdenum. Electrode material is chosen based on five key factors: metal removal rate, wear resistance, surface finish, machinability and cost. Theoretically, tungsten is the best of the materials for use as an electrode, having a very high strength, density, hardness and a melting point near 3400° C. Because of its cost and difficulty to machine, however, pure tungsten is seldom chosen as an electrode material. Instead graphite based alloys are selected as a trade-off between optimum EDM performance and machinability and cost.

In an attempt to address the shortcomings of the conventional machined approach, several techniques of fabricating complex shaped EDM electrodes have been disclosed in the prior art. For example, U.S. Pat. No. 5,108,555 discloses a method for creating EDM electrodes produced using a slurry of gypsum hemihydrate powder as a base and binder, and a filler of conductive metal powder, molded into a form in a silicone rubber tool, followed by plating the electrode with a conductive metal. The process involves kneading the powders with water in a vacuum, followed by casting into a rubber mold. After the electrode is dried, it is plated with conductive metal to enhance mutual continuity in the conductivity of the conductive metal powder as well as to form a thin metal layer on the surface of the electrode. Although this process produces electrodes faster and at a lower expense than the conventional process, the resulting electrodes have an overall lower conductivity and higher wear rate due to the decreased conductive metal density versus conventional electrodes. In addition, sharp corners and thin, deep depressions—features commonly found in diesinking electrodes—will cause difficulty in the plating step of this process. Therefore, that process fails to provide EDM electrodes having complex geometry as well as optimum EDM performance.

U.S. Pat. No. 4,373,127 discloses a process for creating an EDM electrode by shaping a preform from granules of carbon and granules of a refractory material, forming a "skeleton" having the desired shape which is then infiltrated with copper, silver, or alloys containing those metals. The process involves using a replicating master to create a flexible rubber mold. A mixture of carbon and refractory granules is blended with a heat fugitive binder and molded in the rubber mold, resulting in a green molded preform. The preform is packed in a non-reactive refractory powder to prevent sagging or loss of dimension, and heated in a furnace to thermally degrade the binder, leaving a skeletal preform. The preform is infiltrated by placing the chosen infiltrant in contact with the base of the preform and heating it slightly above the melting point of the infiltrant. This process also produces electrodes having a lower conductivity and higher wear rate due to lower density versus conventional machined electrodes. They may also exhibit non-homogeneous density, resulting in shape distortion when the preform is heated and infiltrated, as well as electrodes that exhibit unstable and non-uniform electrical, mechanical and physical properties. Therefore, that process fails to provide EDM electrodes having dimensional stability and optimum EDM performance.

The need exists for a new process for creating accurate, multiple EDM electrodes having complex geometry that minimizes wasted material, shortens cycle time, utilizes less expensive machinery and expertise and does not limit material choices, allowing for optimum EDM materials such as pure tungsten to be utilized.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward. In the following discussion, the term 'electrode geometry' refers to that portion of an EDM electrode containing the desired shape to be electrically discharge machined, and the term 'base geometry' refers to the remaining surface geometry of an EDM electrode which is used for mounting and aligning the electrode in the EDM machine.

Figure 1:
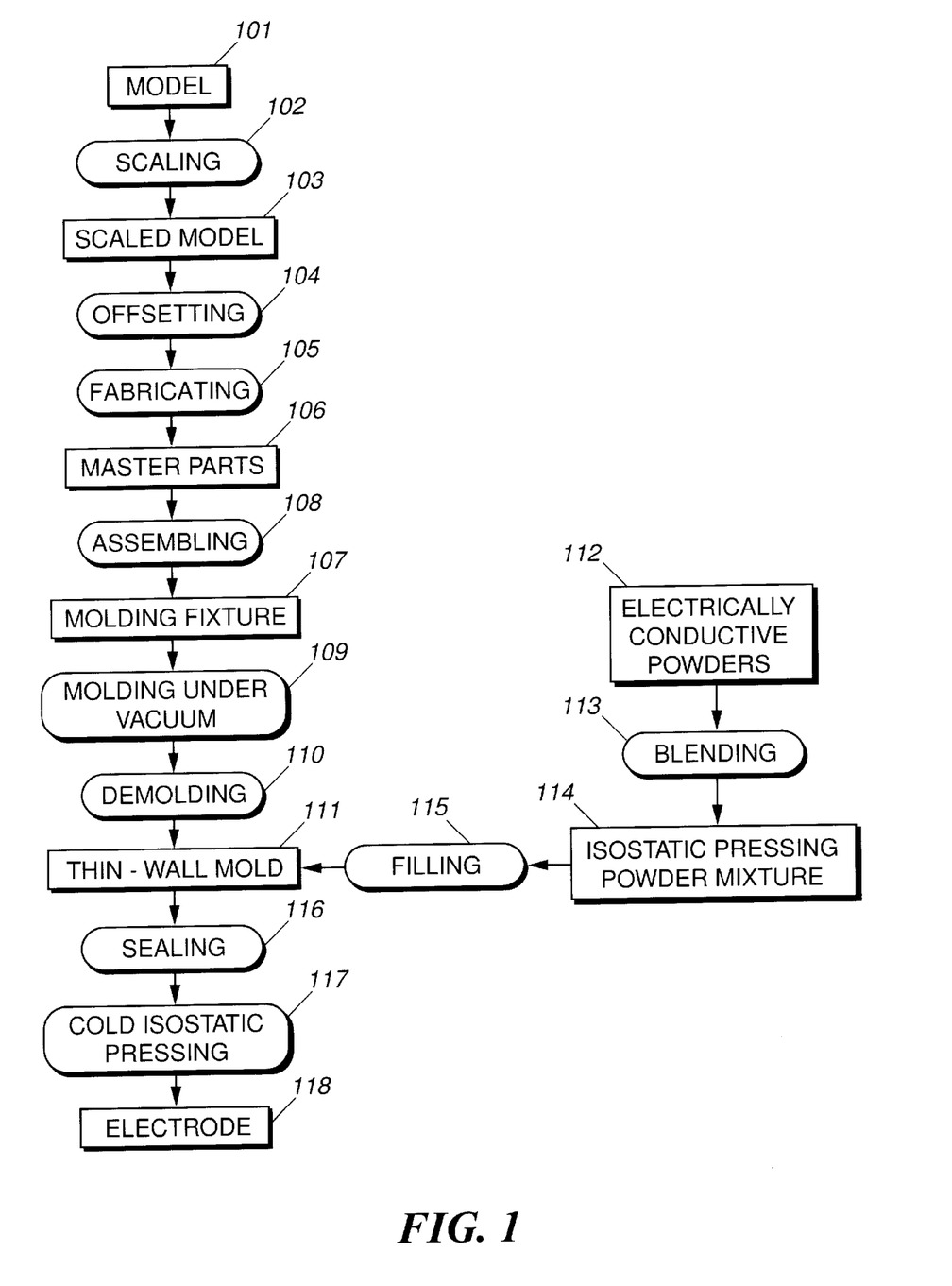
FIG. 1 is a process flow diagram in accordance with the invention.

The method of forming the electrode involves fabricating a thin-wall flexible mold having a uniform wall thickness, preparing a mix of electrically conductive powders, filling the thin-wall flexible mold with the conductive powders, and cold isostatic pressing the powders in the flexible mold. FIG. 1 shows a typical flow chart used to make an EDM electrode in accordance with the instant invention, where the rectangular boxes represent structural entities in the process, and boxes with rounded corners represent process steps to achieve the various structural entities. Referring now to FIG. 1, a computer aided design (CAD) model 101 of the electrode geometry is scaled 102 to account for uniform shrinkage that occurs during the downstream cold isostatic pressing process 117. The magnitude of scaling is determined for a given isostatic pressing powder mixture 114 either through previous experimentation or calculated using theoretical equations as known in the cold isostatic pressing art. The external surfaces of the scaled CAD model 103 are offset 104 in a direction normal to the surfaces a distance equal to the desired wall thickness of the thin-wall mold 111. Collectively, the external surfaces of the scaled CAD model and the offset surfaces form an enclosed volume of uniform thickness, said volume having the desired shape of a thin-wall mold for cold isostatic pressing the electrode geometry. Rapid, automated fabrication techniques 105 such as "multijet modeling" (commercially available from 3D Systems) are then used to create a pair of master parts 106, one master part having a portion which contains the surface geometry of the external surfaces of the scaled CAD model, and the other master part having a portion which contains the surface geometry of the offset surfaces. The master parts are assembled 108 into a molding fixture 107, said molding fixture forming an enclosed volume of uniform thickness which has the desired shape of a thin-wall mold for cold isostatic pressing the base geometry. The master parts are mounted in the molding fixture such that together with the molding fixture they define an enclosed volume of uniform thickness having the desired shape of a thin-wall mold for cold isostatic pressing of an EDM electrode having an electrode geometry and a base geometry. A vacuum is pulled from one end of the enclosed volume while concurrently an elastic, rubbery molding compound such as "RTV-J" silicone rubber (commercially available from Dow Corning Co.) is injected into the opposite end of the enclosed volume in order to mold 109 a flexible form in the desired shape of the thin-wall mold. After curing at room temperature, the master parts and molding fixture are demolded 110 to form the thin-wall mold 111.

Next, one or more electrically conductive powders 112 are blended 113 using blending techniques known in the powder metallurgy art. Examples of suitable powders for our isostatic pressing process are irregularly shaped graphite, copper and tungsten powders. The thin-wall mold is then filled 115 with the isostatic pressing powder mixture 114. Care should be taken during the filling of the mold to avoid segregation of the powder mixture. Vibration can also be used during the filling stage to assist in obtaining a high fill density. The filled mold is then sealed 116 and transferred to a pressure vessel to be cold isostatically pressed 117, a process in which high pressure is applied by pumping a fluid into the vessel. After pressing, the electrode 118 is removed from the mold and ready to be used in the EDM process. Multiple EDM electrodes can thus be rapidly fabricated by repeatedly filling the thin-wall mold, sealing the mold and performing the isostatic pressing.

Figure 2:
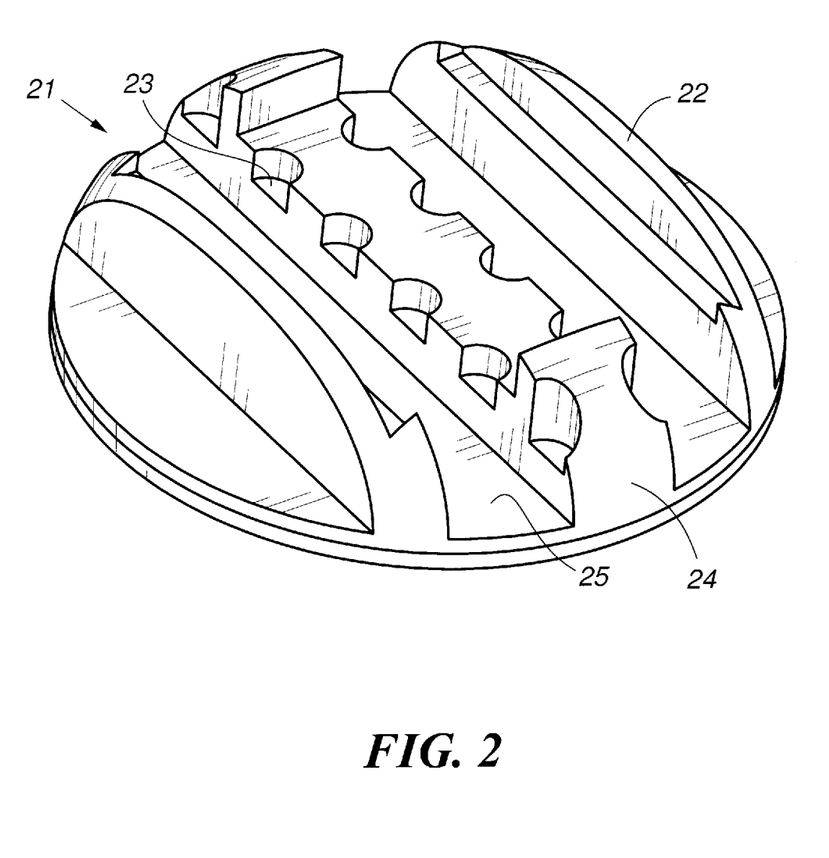
FIG. 2 is an isometric view of a CAD model of an EDM electrode in accordance with the invention.

Having explained our process to rapidly fabricate an EDM electrode, we now turn to a detailed description of the various structural entities in the process. FIG. 2 is a representative example of a CAD model of an electrode geometry to be fabricated as described above. The CAD model 21 of the electrode geometry may be a simple structure, or it may contain a collection of complex surfaces including projections 22, depressions 23, curved 24 and planar 25 surfaces. This collection of complex surfaces corresponds to the shape of a desired cavity to be electrically discharge machined (e.g. the shape of an article desired to be formed by an injection molding or stamping process). In contrast to the prior art, our invention allows the designer complete freedom to add any complex surface to the part, without the need and associated cost of complicated machining of numerous small EDM sub-electrodes. The CAD model is scaled (made bigger) to compensate for shrinkage that occurs during the consolidation and compaction of the powder during isostatic pressing. The percentage of scaling, S, can be calculated with the equation:

$$S = 100 \left( \frac{1}{\sqrt[3]{\frac{\rho_O}{\rho_G}}} - 1 \right)$$

where $\rho_O$ = tap density of the powder,
and $\rho_G$ = green density.

Tap density represents the density of a powder obtained through vibration. It is the highest packing density possible for a powder without the application of pressure. The green density is the powder density after compaction, and is a function of the pressure applied. These values can be obtained for the various powders through experimentation or from the powder vendors. The above equation is useful as a good estimation of the dimensional scaling needed. If a finished electrode prepared according to the process of the present invention exhibits unacceptable dimensional change (e.g. shrinkage), then the dimensions of the CAD model can be further adjusted.

Figure 3:
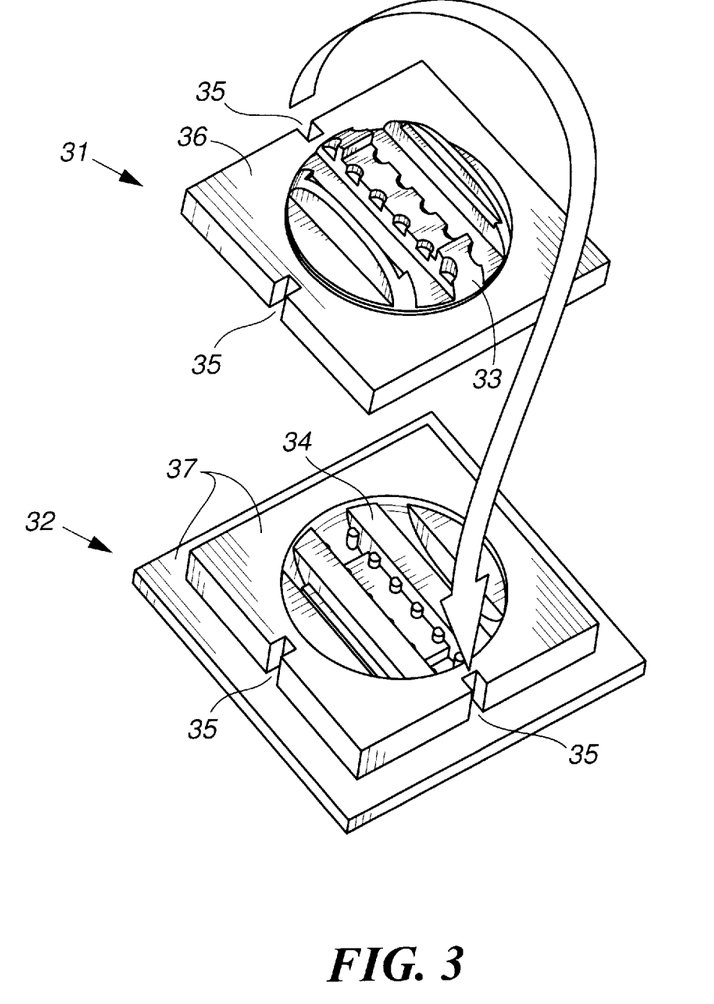
FIG. 3 is an exploded isometric view of a CAD model of two master parts.

The scaled CAD model is then used to design a set of master parts. FIG. 3 shows the pair of master parts for the CAD model of FIG. 2. The first master part 31 is designed by merging the CAD model with a base 36 which fits into the molding fixture. The second master part 32 is designed by offsetting the electrode surface 33 of the first master part by a predetermined distance that is normal to the respective surfaces of the scaled model, followed by using the offset surface to perform a Boolean subtraction operation from a second base 37. This results in the second master part having a relief surface 34, such that when the first and second master parts 31, 32 are assembled into the molding fixture the surfaces 33 and 34 collectively define a cavity of pre-determined thickness. The master parts may optionally include alignment and registration features 35 to assist assembly in the subsequent mold fixture.

Having now created a CAD model of the master parts, in the preferred embodiment the master parts are fabricated using an automated, rapid fabrication process such as one of the many commercially available free-form rapid prototyping processes, including stereolithography, ink-jet printing, fused-deposition modeling, laser sintering, laminated object manufacturing, etc. Speed and accuracy are the main concerns when selecting a process for fabricating the master parts. Two suitable manufacturing processes are "multi-jet modeling" (commercially available from 3D Systems) and "ink-jet printing" (commercially available from Sanders Prototype). Other forming and machining means of fabricating the master parts such as carving, machining, lost wax casting, etc. can be used and still fall within the scope and spirit of this invention. The master parts can also be made from wood, plastic, metal, wax, paper or other processable materials.

Figure 4:
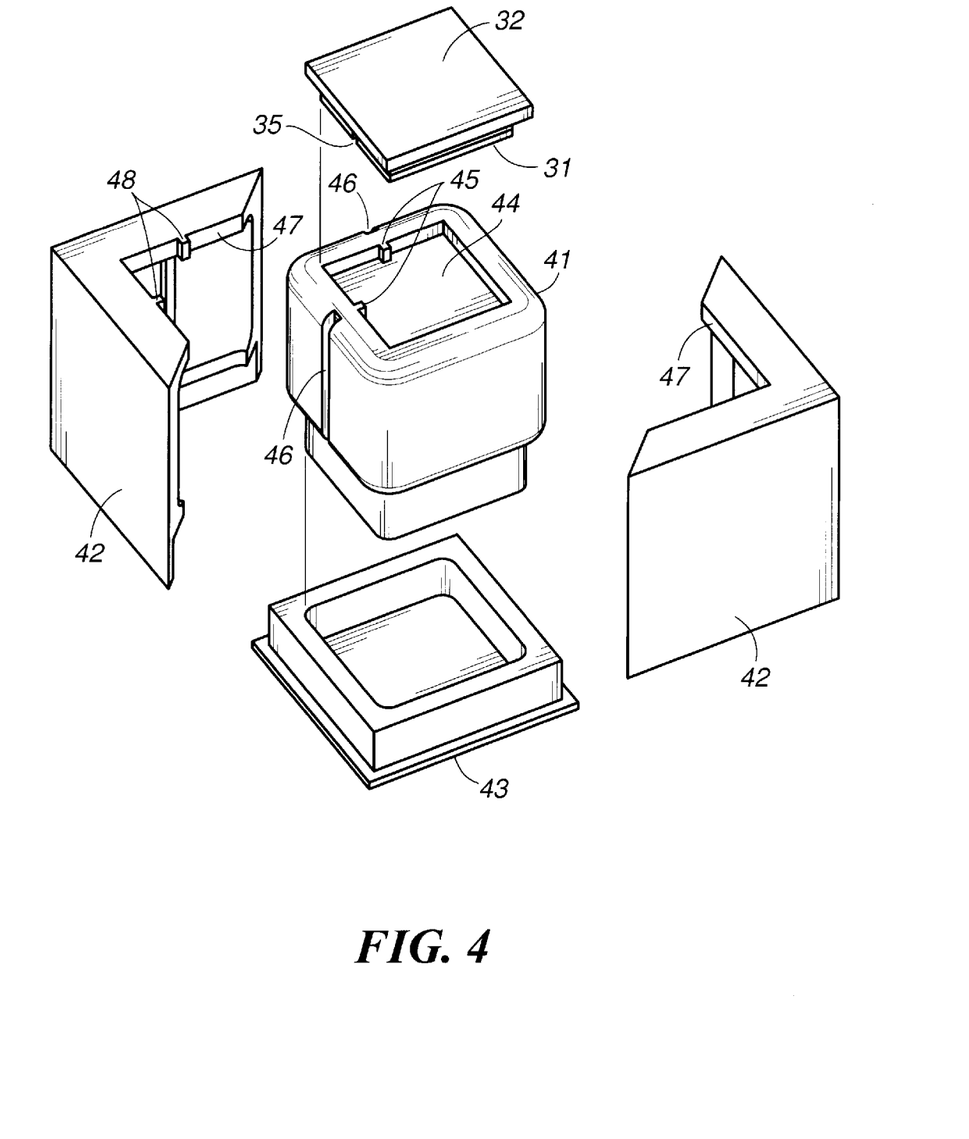
FIG. 4 is an exploded isometric view of a mold assembly for forming a flexible mold.

The master parts are designed to fit into a molding fixture. FIG. 4 shows one such molding fixture composed of a mandrel 41, side walls 42, and a base 43. The mandrel contains a depressed portion 44 into which the first master part 31 is assembled. Registration features 45 mate with corresponding mating features 35 to assist in aligning the first master part. On the external surfaces of the mandrel 41 are slot features 46 which form internal ribs on the thin-wall mold. These ribs, in turn, form slot features on the finished electrode, which are used to orient and align the electrode in the EDM machine. The side walls contain surfaces 47 which mate with the second master part. Registration features 48 mate with corresponding mating features (35, not shown) to assist in aligning the second master part. Multiple molding fixtures can be created for creating electrodes of varying shapes and sizes, as well as electrodes of varying material composition.

Figure 5:
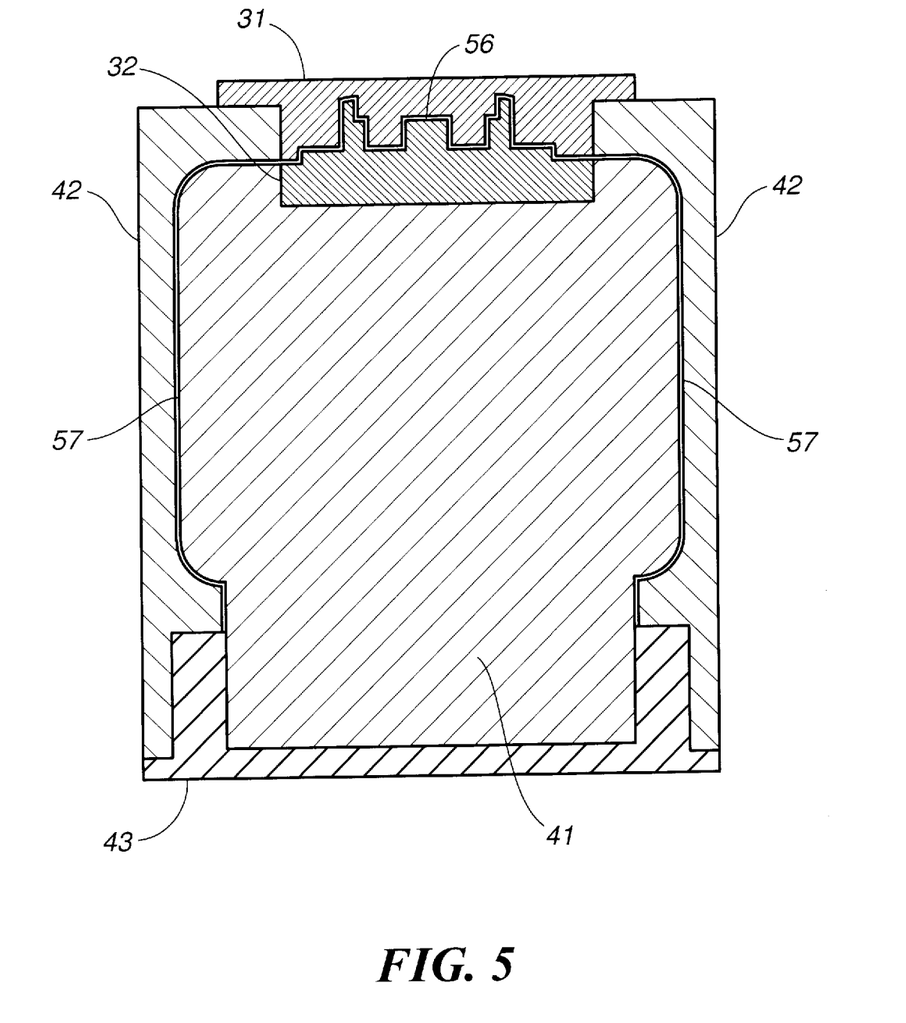
FIG. 5 is a full sectional view of the assembled mold of FIG. 4.

When assembled, the mold fixture including master parts is used to create the thin-wall mold. FIG. 5 displays a cross-sectional view of the assembled mold fixture and master parts. Master parts 31 and 32 combine to form an enclosed volume 56 of uniform thickness, said volume forming a portion of a thin-wall mold for isostatically pressing the electrode geometry. Side walls 42, mandrel 41, and base 43 combine to form an enclosed volume 57 of uniform thickness, said volume forming the portion of a thin-wall mold for isostatically pressing the base geometry. In practice, the mold fixture assembly is used to form a thin-wall mold by injecting a molding compound into the evacuated enclosed volume 57 at one or more points (not shown).

The molding compounds which can be used to prepare the thin-wall mold in the process of this invention are those which cure to an elastic or flexible rubbery form and generally have a Shore A durometer value of about 30–80, and reproduce the fine details of the master parts to an acceptable degree of accuracy. To maintain dimensional control, it is preferred that the molding compounds are curable silicone rubbers and urethane resins having little (less than 0.5%) or no post cure shrinkage. Other methods and materials to form a thin-wall mold compatible with the isostatic pressing process will be known to those skilled in the art, such as but not limited to hydroforming, vacuum forming, stamping and blow molding of plastics, sheet metals, foams etc., and may be used without diverging from the spirit of this invention. Any of these techniques that provide a mold that is flexible enough to deform under pressures in excess of 10 MPa (megaPascals) are considered to be 'flexible'.

Figure 6:
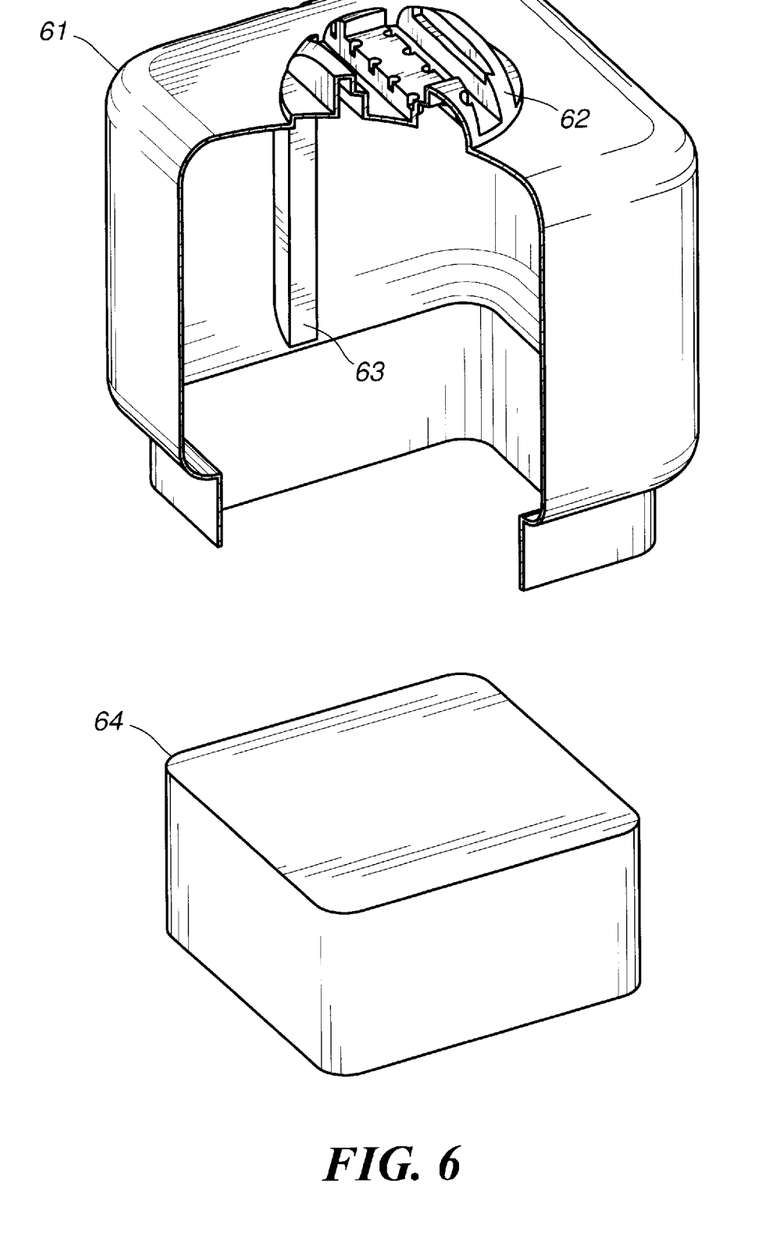
FIG. 6 is a cut-away isometric view of the thin-wall mold produced from the mold shown in FIG. 4.

FIG. 6 displays the thin-wall flexible mold 61 formed from the molding fixture assembly of FIG. 5. The thin-wall mold contains surface features 62 that mimic the EDM electrode geometry, and will be formed in a subsequent isostatic pressing step. Internally, protruding rib features 63 are used for forming registration and alignment slots on the pressed electrodes. A plug 64 is used to seal the mold after filling with the powder. Powders useful for fabricating the electrodes of this invention include electrically conductive powders which are compatible with the isostatic pressing process. Two powders which have worked well include 200 RLX-GHS copper friction powder (commercially available from SCM Metals) and grade C-10 Tungsten powder (commercially available from Teledyne Advanced Materials Company). Characteristics which affect the EDM performance of the electrodes includes electrical resistivity, melting point and density of the electrode. Lower electrical resistivity, higher melting point and higher density results in more efficient "burning" and less electrode wear. The density of the electrode is the green density of the powder, which is a function of powder geometry, initial fill density and applied pressure. Typical powder geometries that work well with the isostatic pressing process and result in good densities include rounded, irregular, fibrous, flake, polygonal, dendritic and aggregate. One or more powders of differing size, composition and shape may be mixed to tailor electrode properties for a desired use, i.e. roughing versus finishing. A high packing density can be obtained by mixing graded particle sizes that are significantly different and the mixture composition optimized. For example, two particles with a size ratio of 7:1 can be homogeneously mixed to a high packing density using a weight percent composition of 73:27. In optimal packing, the largest particles form a fixed skeleton so that successively smaller particles fill the remaining voids.

After the thin-wall flexible mold 61 is filled as in step 115, it is capped or sealed in step 116 by inserting the plug 64 and sealing with tape or other means. The mold is placed into the pressure vessel and isostatically pressed. The technique of isostatic pressing is well known, and involves hydraulically pressing the exterior of the flexible mold under high pressures to uniformly compact the powder into a solid mass. Cold isostatic pressing typically occurs at room temperature, and although this is the preferred embodiment, one may also choose to employ warm isostatic pressing, which is at an elevated temperature. Note, however, that warm isostatic pressing differs from the conventional hot isostatic pressing, which occurs at high temperatures, and is not considered necessary for our invention. The isostatic pressing step typically takes less than five minutes, then the seal is removed from the mold and the solid EDM electrode is extracted. Since the flexible thin-wall mold 61 can be reused, multiple electrodes can be created in a short time by repeatedly pressing electrodes in. this manner.

Figure 7:
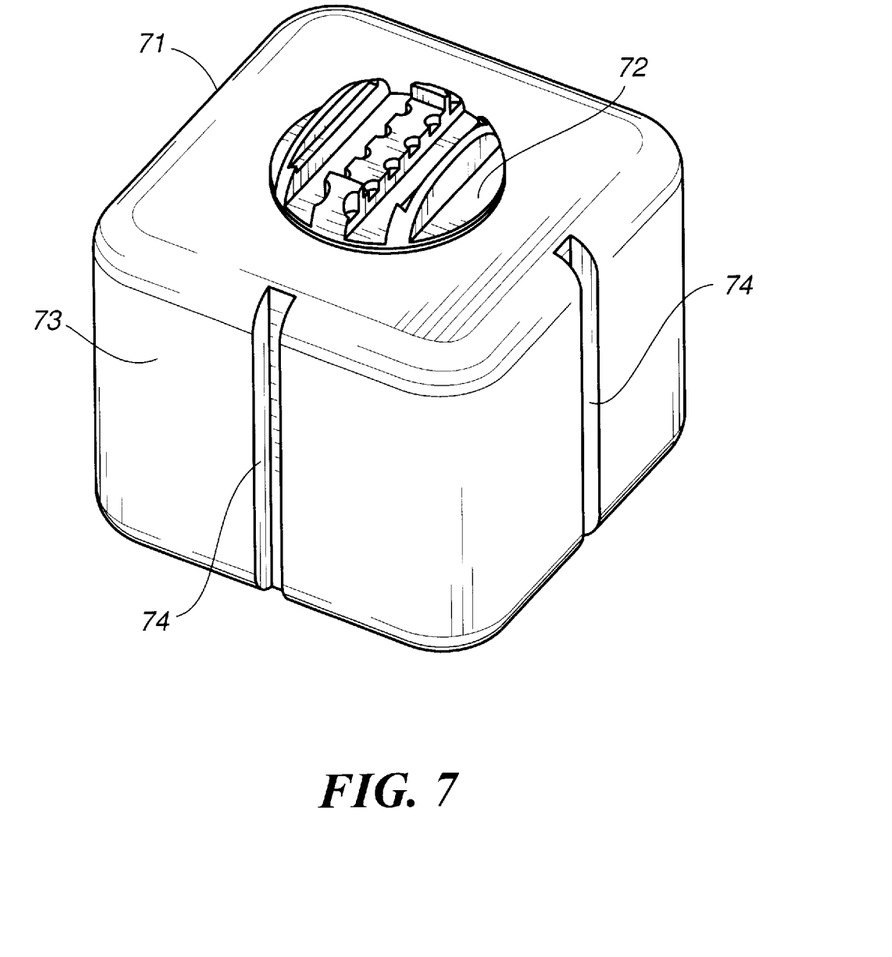
FIG. 7 is an isometric view of an EDM electrode fabricated in accordance with the invention.

FIG. 7 shows the completed EDM electrode 71 produced using the process of the present invention. The electrode contains electrode geometry 72 corresponding to the desired cavity to be created via electrical discharge machining. The base 73 includes slots 74 which are used to align and register the electrode in the EDM machine. In use, the electrode is fixtured in the EDM machine, energized, and slowly lowered into the surface of a workpiece (e.g. tool steel). The electrical discharge passing between the electrode and the workpiece erodes a cavity in the workpiece in a female shape corresponding to the electrode geometry. The completed cavity may be used as, for example, a die in which materials such as plastics are shaped by stamping or injection molding. The shape of such a shaped plastic part will correspond to the shape of the electrode geometry.

In summary, a rapid process for fabricating a precision EDM electrode has been described. The process utilizes some conventional technologies from diverse industries in a novel manner and combination to enable multiple EDM electrodes to be made from a single flexible mold tool using cold isostatic pressing of conductive powders. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rapid method for fabricating a precision electrode, comprising:

fabricating a flexible mold having a portion that represents the electrode by vacuum molding an elastomeric material;

filling the flexible mold with an electrically conductive powder; and isostatically pressing the filled mold to compact the electrically conductive powder and form the electrode.

2. A rapid method for fabricating a precision electrode, comprising:

fabricating master parts that represent the electrode using a rapid prototyping technique;

fabricating a flexible mold from the master parts;

filling the flexible mold with an electrically conductive powder; and isostatically pressing the filled mold to compact the electrically conductive powder and form the electrode.

3. The method as described in claim 2, wherein the step of fabricating a master part comprises fabricating a master part using stereolithography, ink-jet printing, fused-deposition modeling, laser sintering, or laminated object manufacturing.

4. The method as described in claim 2, further comprising a step of creating a computer model of the electrode prior to the step of fabricating master parts.

5. A rapid method for fabricating a precision electrical discharge machining electrode, comprising the following steps in the order named:

a) creating a computer model of the electric discharge machining electrode;

b) scaling the computer model to allow for shrinkage;

c) offsetting a portion of the scaled computer model in a direction normal to respective surfaces of the scaled model;

d) fabricating master parts using the models made in steps (b) and (c) by a rapid prototyping technique;

e) molding a flexible elastomer in the master parts to form a flexible mold;

f) filling the flexible mold with an electrically conductive powder;

g) cold isostatically pressing the electrically conductive powder filled mold of step (f) to form a solid electric discharge machining electrode; and h) removing the solid electric discharge machining electrode from the flexible mold.

* * * * *